United States Patent
Wang et al.

(10) Patent No.: US 11,474,242 B2
(45) Date of Patent: Oct. 18, 2022

(54) LANE STRIPE DETECTING METHOD BASED ON THREE-DIMENSIONAL LIDAR AND SYSTEM THEREOF

(71) Applicant: Automotive Research & Testing Center, Changhua County (TW)

(72) Inventors: Yu-Fang Wang, Changhua County (TW); Yi-Shueh Tsai, Changhua County (TW); Li-You Hsu, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 989 days.

(21) Appl. No.: 16/207,211

(22) Filed: Dec. 3, 2018

(65) Prior Publication Data

US 2020/0142067 A1    May 7, 2020

(30) Foreign Application Priority Data

Nov. 1, 2018  (TW) .................................. 107138835

(51) Int. Cl.
   *G01S 17/42*    (2006.01)
   *G01S 7/48*    (2006.01)
   *G01S 17/931*    (2020.01)

(52) U.S. Cl.
   CPC ............ *G01S 17/42* (2013.01); *G01S 7/4808* (2013.01); *G01S 17/931* (2020.01)

(58) Field of Classification Search
   None
   See application file for complete search history.

(56) References Cited

U.S. PATENT DOCUMENTS

| 2015/0125039 A1* | 5/2015 | Wu | G06V 10/44 |
| 2016/0229399 A1* | 8/2016 | Wada | B60W 50/0097 |
| 2018/0060677 A1* | 3/2018 | Bai | G06K 9/627 |

FOREIGN PATENT DOCUMENTS

| CN | 103499343 A | 1/2014 |
| CN | 105404844 A | 3/2016 |
| CN | 106127113 A | 11/2016 |

* cited by examiner

*Primary Examiner* — Christopher G Findley
(74) *Attorney, Agent, or Firm* — CKC & Partners Co., LLC

(57) ABSTRACT

A lane stripe detecting method based on a three-dimensional LIDAR is for detecting a lane stripe of a road surface around a vehicle. A data acquisition transforming step is for obtaining a plurality of vehicle scan point coordinates. The vehicle scan point coordinates are divided into a plurality of scan lines, and each of the scan lines has a plurality of scan points. A horizontal layer lane stripe judging step is judging whether each of the scan points is a horizontal stripe point or a non-horizontal stripe point according to a threshold value of each of the scan lines. At least two of the threshold values of the scan lines are different from each other. A vertical layer lane stripe judging step is for judging whether each of the horizontal stripe points is a same lane stripe point or a different lane stripe point.

18 Claims, 15 Drawing Sheets

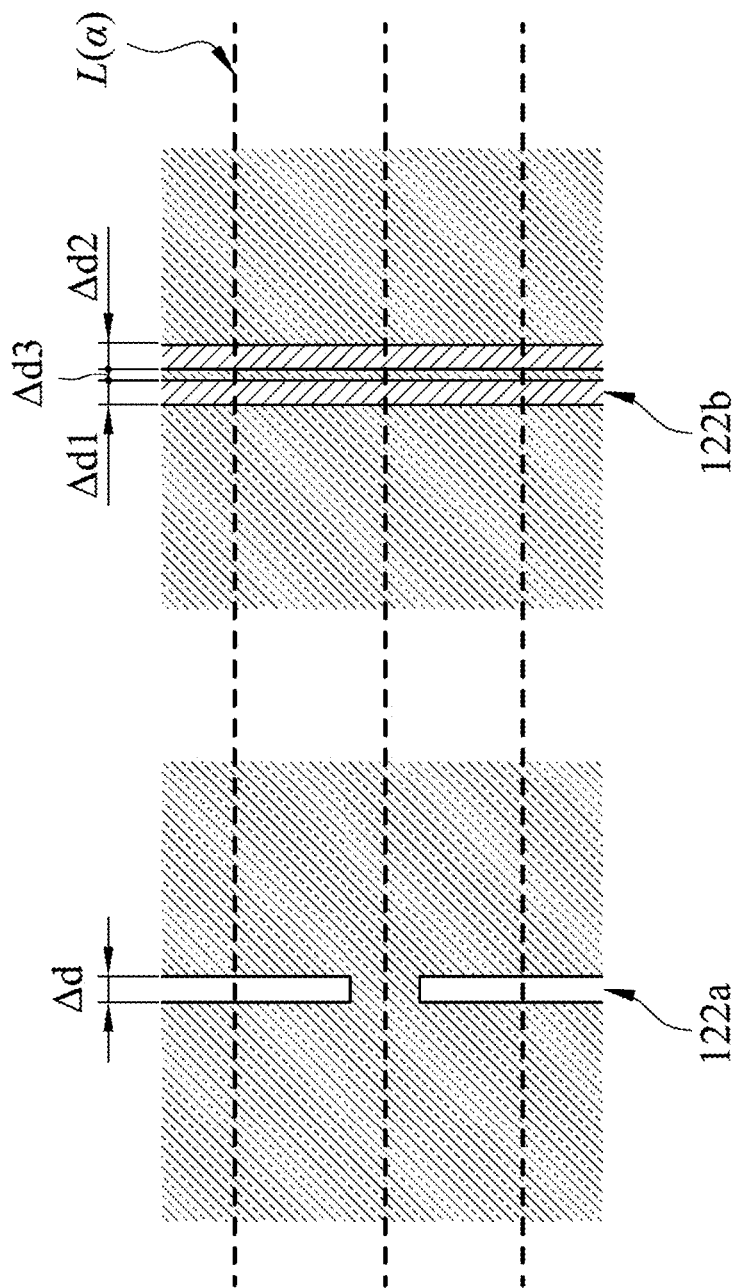

LANE STRIPE DETECTING METHOD BASED ON THREE-DIMENSIONAL LIDAR AND SYSTEM THEREOF

RELATED APPLICATIONS

This application claims priority to Taiwan Application Serial Number 107138835 filed on Nov. 1, 2018, which is herein incorporated by reference.

BACKGROUND

Technical Field

The present disclosure relates to a lane stripe detecting method. More particularly, the present disclosure relates to a lane stripe detecting method based on a three-dimensional LIDAR.

Description of Related Art

A lane stripe detecting method is used either to alert a vehicle driver of the presence of lane stripe in the vehicle driving path, or to provide the feasible driving area constraint for route planning in autonomous driving. The issue is that most systems utilize a vision-based system such as a camera to analyze the captured image. Such vision-based systems are susceptible to incorrectly distinguishing lane stripes due to the lighting conditions in environments and image quality. In addition, there is a lane stripe detecting method using a high resolution LIDAR sensor (at least 32 layers) in the market. The lane stripe detecting method using the high resolution LIDAR sensor will obtain a very large amount of point cloud data and be expensive so as to increase the cost. Therefore, a lane stripe detecting method based on a three-dimensional LIDAR and a system thereof having the features of using a low resolution LIDAR sensor to improve the correctness and the accuracy of detection are commercially desirable.

SUMMARY

According to one aspect of the present disclosure, a lane stripe detecting method based on a three-dimensional LIDAR for detecting a lane stripe of a road surface around a vehicle includes a data acquisition transforming step, a horizontal layer lane stripe judging step and a vertical layer lane stripe judging step. The data acquisition transforming step is for obtaining a plurality of three-dimensional LIDAR scan point coordinates of the road surface via a three-dimensional LIDAR sensor disposed on the vehicle, and then transforming the three-dimensional LIDAR scan point coordinates into a plurality of vehicle scan point coordinates according to a coordinate transformation equation. The vehicle scan point coordinates are corresponding to the vehicle and divided into a plurality of scan lines, and each of the scan lines has a plurality of scan points. The horizontal layer lane stripe judging step includes a stripe point cloud searching step. The stripe point cloud searching step includes a point cloud intensity judging step. The point cloud intensity judging step is for calculating intensity of the scan points of each of the scan lines to obtain a threshold value according to a thresholding method and judging whether each of the scan points is a horizontal stripe point or a non-horizontal stripe point according to the threshold value of each of the scan lines. At least two of the threshold values of the scan lines are different from each other. The vertical layer lane stripe judging step includes a continuity analyzing step. The continuity analyzing step is for analyzing a slope of the horizontal stripe points of any two adjacent ones of the scan lines and judging whether each of the horizontal stripe points is a same lane stripe point or a different lane stripe point according to a comparison result of a predetermined threshold slope and the slope. The same lane stripe point is corresponding to the lane stripe.

According to another aspect of the present disclosure, a lane stripe detecting method based on a three-dimensional LIDAR for detecting a lane stripe of a road surface around a vehicle includes a data acquisition transforming step, a horizontal layer lane stripe judging step and a vertical layer lane stripe judging step. The data acquisition transforming step is for obtaining a plurality of three-dimensional LIDAR scan point coordinates of the road surface via a three-dimensional LIDAR sensor disposed on the vehicle, and then transforming the three-dimensional LIDAR scan point coordinates into a plurality of vehicle scan point coordinates according to a coordinate transformation equation. The vehicle scan point coordinates are divided into a plurality of scan lines, and each of the scan lines has a plurality of scan points. The horizontal layer lane stripe judging step includes a stripe point cloud searching step. The stripe point cloud searching step includes a point cloud intensity judging step and an intensity difference analyzing step. The point cloud intensity judging step is for calculating intensity of the scan points of each of the scan lines to obtain a threshold value according to a thresholding method and judging whether each of the scan points is a horizontal stripe point or a non-horizontal stripe point according to the threshold value of each of the scan lines. The intensity difference analyzing step is for analyzing intensity of the scan points of each of the scan lines to obtain a plurality of intensity difference values of any two adjacent ones of the scan points according to an edge detecting method and judging whether each of the scan points is a horizontal stripe edge point or a non-horizontal stripe edge point according to a comparison result of a predetermined difference value and the intensity difference values. Then, the intensity difference analyzing step is for determining a plurality of horizontal point cloud stripe points according to the horizontal stripe points and the horizontal stripe edge points of each of the scan lines. The vertical layer lane stripe judging step includes a continuity analyzing step. The continuity analyzing step is for analyzing a slope of the horizontal point cloud stripe points of any two adjacent ones of the scan lines and judging whether each of the horizontal point cloud stripe points is a same lane stripe point or a different lane stripe point according to a comparison result of a predetermined threshold slope and the slope. The same lane stripe point is corresponding to the lane stripe.

According to further another aspect of the present disclosure, a lane stripe detecting system based on a three-dimensional LIDAR is configured to detect a lane stripe of a road surface around a vehicle. The lane stripe detecting system includes a three-dimensional LIDAR sensor and a point cloud processing unit. The three-dimensional LIDAR sensor is disposed on the vehicle. The three-dimensional LIDAR sensor is configured to obtain a plurality of three-dimensional LIDAR scan point coordinates of the road surface. The point cloud processing unit is signally connected to the three-dimensional LIDAR sensor and includes a data acquisition transforming module, a horizontal layer lane stripe judging module and a vertical layer lane stripe judging module. The data acquisition transforming module is signally connected to the three-dimensional LIDAR sensor. The data acquisition transforming module is configured to transform the three-dimensional LIDAR scan point coordinates into a plurality of vehicle scan point coordinates according to a coordinate transformation equation. The vehicle scan point coordinates are divided into a plurality of scan lines, and each of the scan lines has a plurality of scan points. The horizontal layer lane stripe judging module is signally connected to the data acquisition transforming module. The horizontal layer lane stripe judging module is configured to calculate intensity of the scan points of each of the scan lines to obtain a threshold value according to a thresholding method and judge whether each of the scan points is a horizontal stripe point or a non-horizontal stripe point according to the threshold value of each of the scan lines. At least two of the threshold values of the scan lines are different from each other. The vertical layer lane stripe judging module is signally connected to the horizontal layer lane stripe judging module. The vertical layer lane stripe judging module is configured to analyze a slope of the horizontal stripe points of any two adjacent ones of the scan lines and judge whether each of the horizontal stripe points is a same lane stripe point or a different lane stripe point according to a comparison result of a predetermined threshold slope and the slope. The same lane stripe point is corresponding to the lane stripe.

BRIEF DESCRIPTION OF THE DRAWINGS

The present disclosure can be more fully understood by reading the following detailed description of the embodiment, with reference made to the accompanying drawings as follows:

FIG. 9A shows a schematic view of a single lane stripe of a lane stripe in a lane stripe width filtering step of FIG. 5.

FIG. 9B shows a schematic view of a dual lane stripe of the lane stripe in the lane stripe width filtering step of FIG. 5.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or module) is referred to as be "disposed on" or "connected to" another element, it can be directly disposed on or connected to the other element, or it can be indirectly disposed on or connected to the other element, that is, intervening elements may be present. In contrast, when an element is referred to as be "directly disposed on" or "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
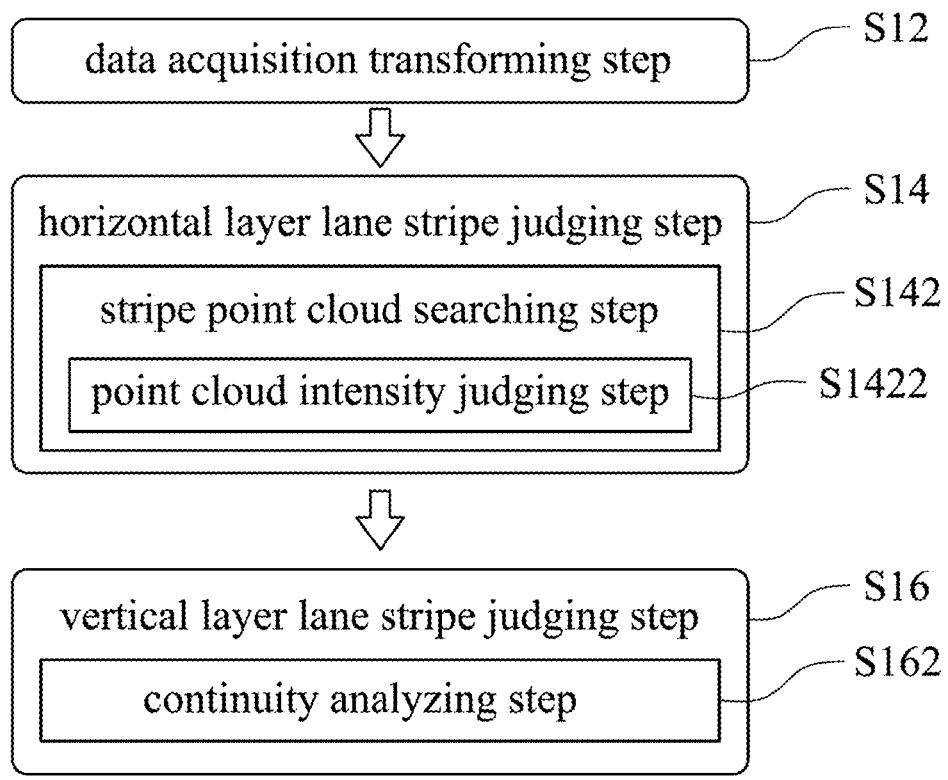
FIG. 1 shows a flow chart of a lane stripe detecting method based on a three-dimensional LIDAR according to a first embodiment of the present disclosure.
Figure 2:
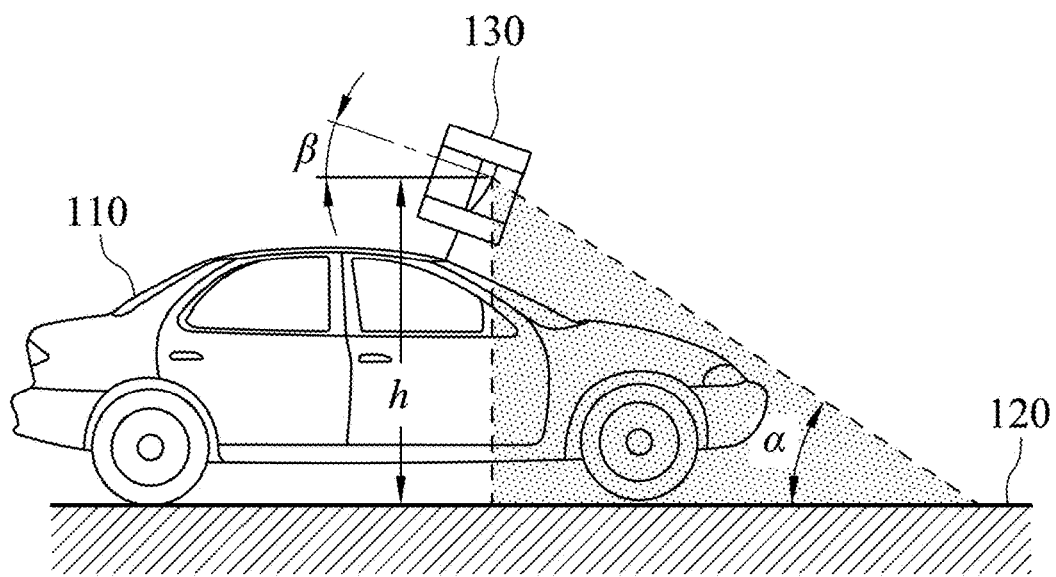
FIG. 2 shows a schematic view of a three-dimensional LIDAR sensor and a vehicle in a data acquisition transforming step of FIG. 1.
Figure 3:
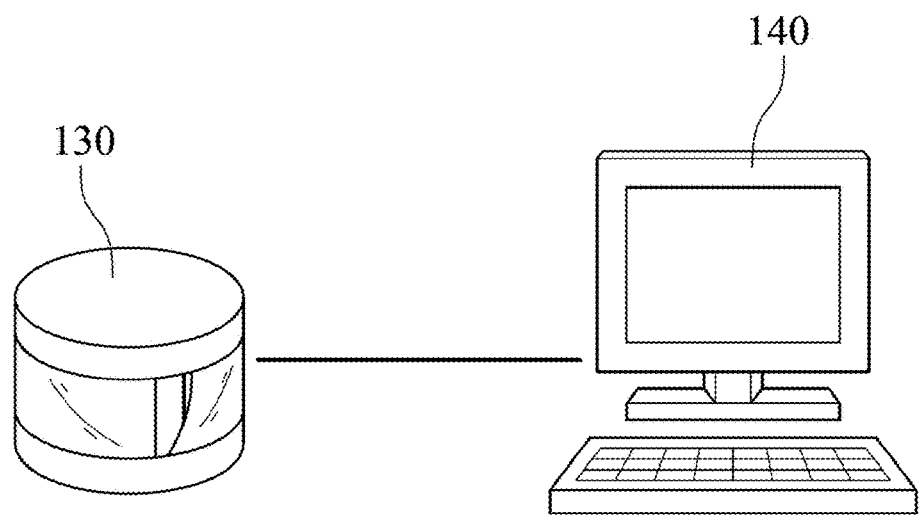
FIG. 3 shows a schematic view of the three-dimensional LIDAR sensor and a point cloud processing unit in the data acquisition transforming step of FIG. 1.
Figure 4:
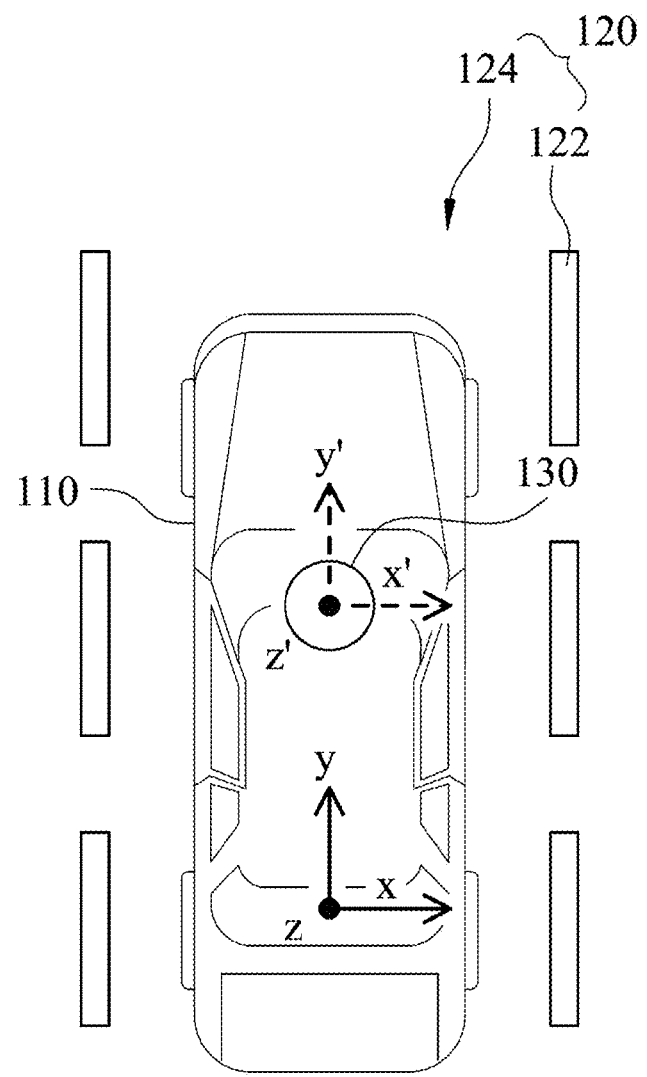
FIG. 4 shows a schematic top view of the vehicle disposed on a road surface in the data acquisition transforming step of FIG. 1.

FIG. 1 shows a flow chart of a lane stripe detecting method 100 based on a three-dimensional light detection and ranging (LIDAR) according to a first embodiment of the present disclosure. FIG. 2 shows a schematic view of a three-dimensional LIDAR sensor 130 and a vehicle 110 in a data acquisition transforming step S12 of FIG. 1. FIG. 3 shows a schematic view of the three-dimensional LIDAR sensor 130 and a point cloud processing unit 140 in the data acquisition transforming step S12 of FIG. 1. FIG. 4 shows a schematic top view of the vehicle 110 disposed on a road surface 120 in the data acquisition transforming step S12 of FIG. 1. The lane stripe detecting method 100 based on a three-dimensional LIDAR is for detecting a lane stripe 122 of the road surface 120 around the vehicle 110. The road surface 120 includes the lane stripe 122 and a ground surface 124. The lane stripe 122 is formed by a white paint, a yellow paint or a red paint. The ground surface 124 is formed by asphalt. The lane stripe detecting method 100 based on the three-dimensional LIDAR includes the data acquisition transforming step S12, a horizontal layer lane stripe judging step S14 and a vertical layer lane stripe judging step S16.

The data acquisition transforming step S12 is for obtaining a plurality of three-dimensional LIDAR scan point coordinates (x',y',z') of the road surface 120 via the three-dimensional LIDAR sensor 130. The three-dimensional LIDAR sensor 130 is disposed on the vehicle 110 and corresponding to the three-dimensional LIDAR scan point coordinates (x',y',z'). Then, the data acquisition transforming step S12 is for transforming the three-dimensional LIDAR scan point coordinates (x',y',z') into a plurality of vehicle scan point coordinates (x,y,z) according to a coordinate transformation equation. The vehicle scan point coordinates (x,y,z) are corresponding to the vehicle 110 and divided into a plurality of scan lines L(α), and each of the scan lines L(α) has a plurality of scan points P(α,i). The horizontal layer lane stripe judging step S14 includes a stripe point cloud searching step S142. The stripe point cloud searching step S142 includes a point cloud intensity judging step S1422. The point cloud intensity judging step S1422 is for calculating intensity of the scan points P(α,i) of each of the scan lines L(α) to obtain a threshold value $T_n$ according to a thresholding method and judging whether each of the scan points P(α,i) is a horizontal stripe point Phs(α,i) or a non-horizontal stripe point Pnhs(α,i) according to the threshold value $T_n$ of each of the scan lines L(α). At least two of the threshold values $T_n$ of the scan lines L(α) are different from each other. The vertical layer lane stripe judging step S16 includes a continuity analyzing step S162. The continuity analyzing step S162 is for analyzing a slope of the horizontal stripe points Phs(α,i) of any two adjacent ones of the scan lines L(α) and judging whether each of the horizontal stripe points Phs(α,i) is a same lane stripe point or a different lane stripe point according to a comparison result of a predetermined threshold slope and the slope. The same lane stripe point is corresponding to the lane stripe 122. Therefore, the lane stripe detecting method 100 based on the three-dimensional LIDAR of the present disclosure utilizes original point cloud data (e.g., the three-dimensional LIDAR scan point coordinates (x',y',z')) to detect the lane stripe 122 in an autonomous driving system so as to assist an autonomous driving vehicle (e.g., the vehicle 110) to improve the safety of the autonomous driving. In addition, the hierarchical point cloud intensity judgement of the horizontal layer lane stripe judging step S14 combined with the continuity analysis of the vertical layer lane stripe judging step S16 can allow the lane stripe detecting method 100 to be more flexible and greatly improve the correctness of the judgement.

Figure 5:
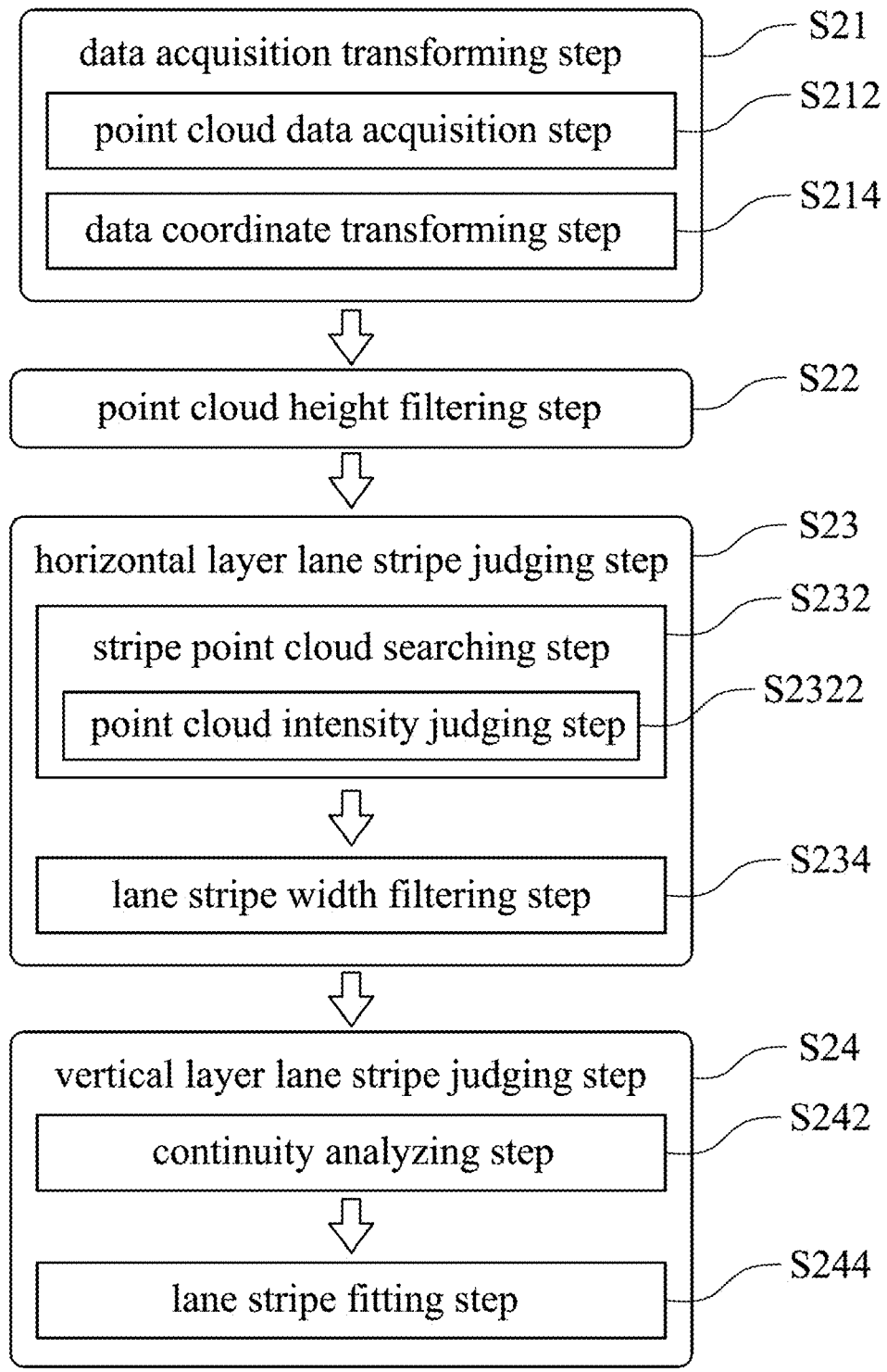
FIG. 5 shows a flow chart of a lane stripe detecting method based on a three-dimensional LIDAR according to a second embodiment of the present disclosure.
Figure 6:
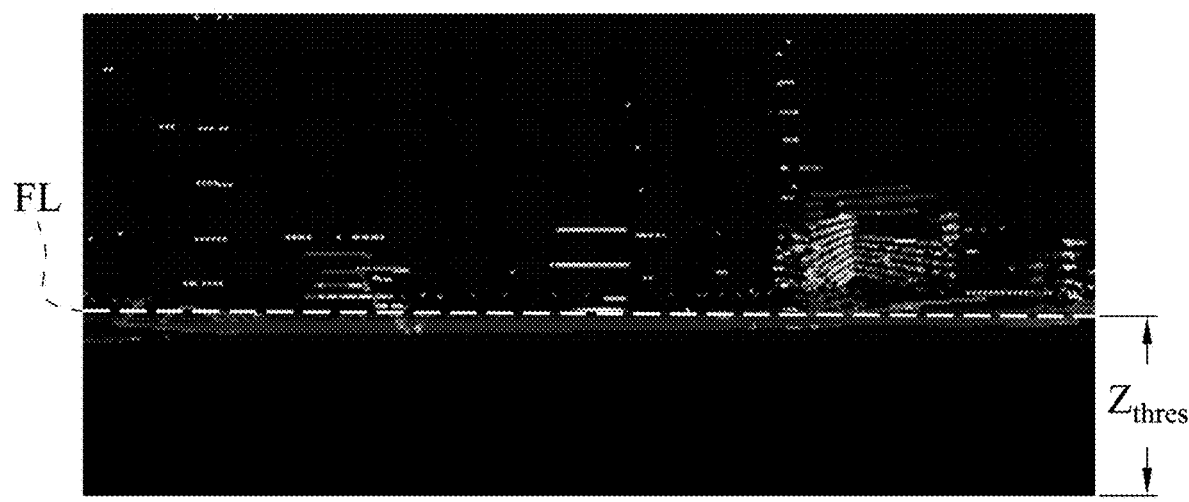
FIG. 6 shows a schematic view of a point cloud height filtering step of FIG. 5.
Figure 7:
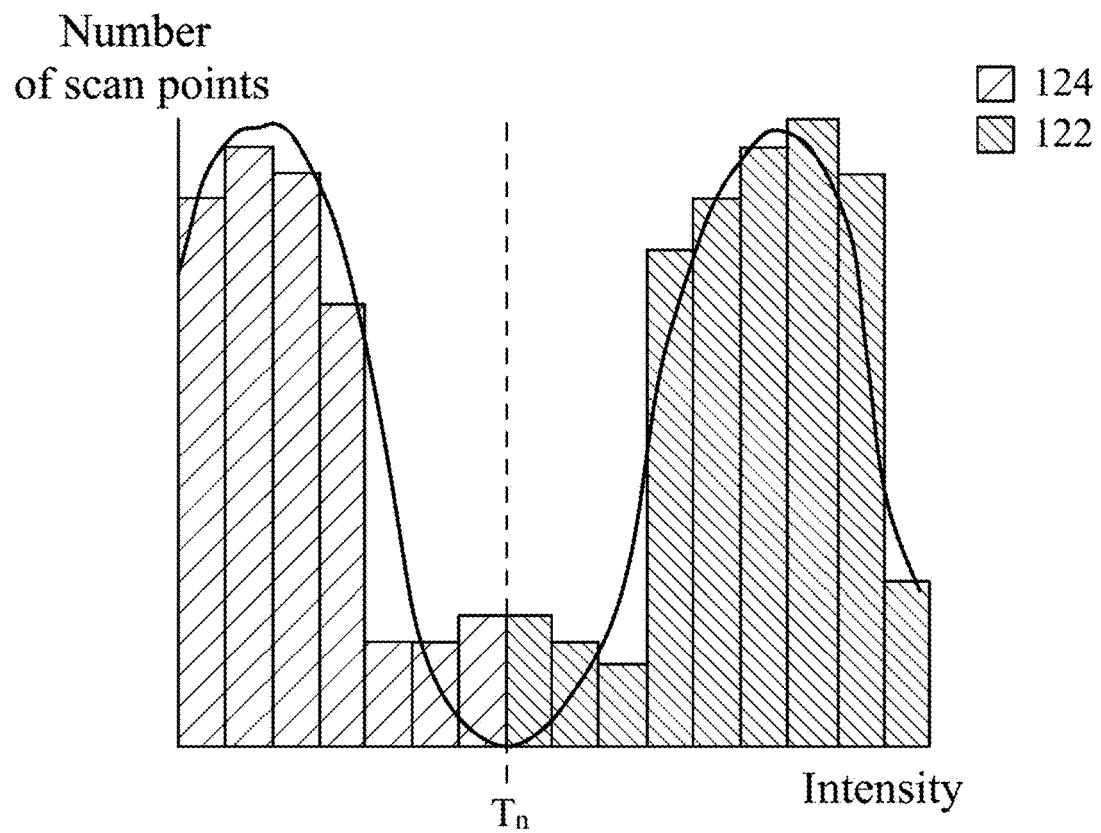
FIG. 7 shows a schematic view of a thresholding method in a point cloud intensity judging step of FIG. 5.
Figure 8:
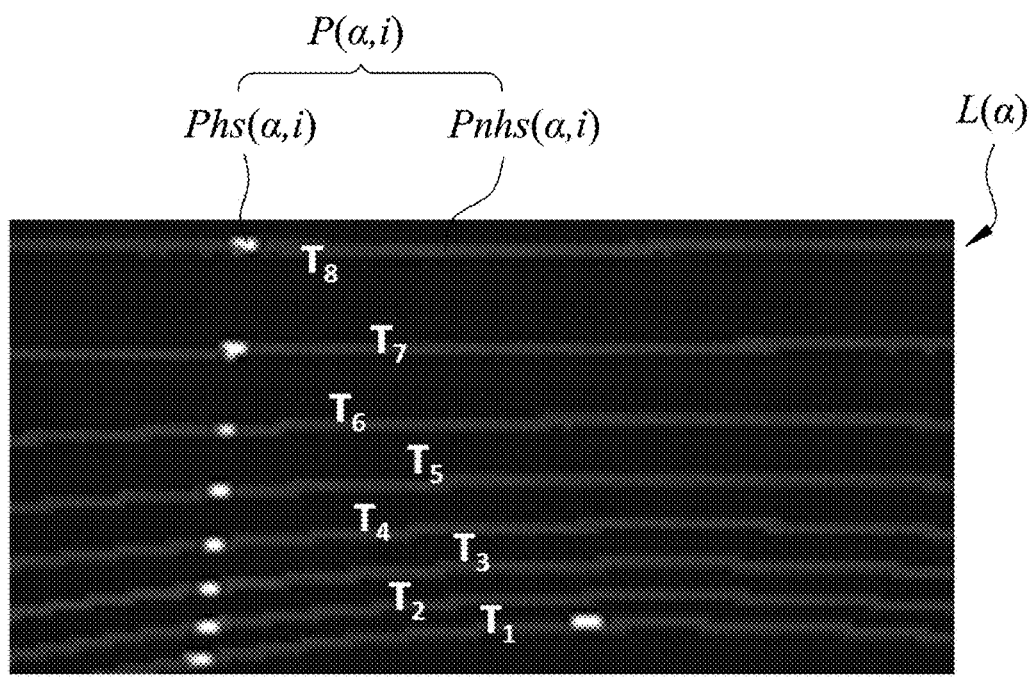
FIG. 8 shows a schematic view of a threshold value of each of a plurality of scan lines in a point cloud intensity judging step of FIG. 5.
Figure 10A:
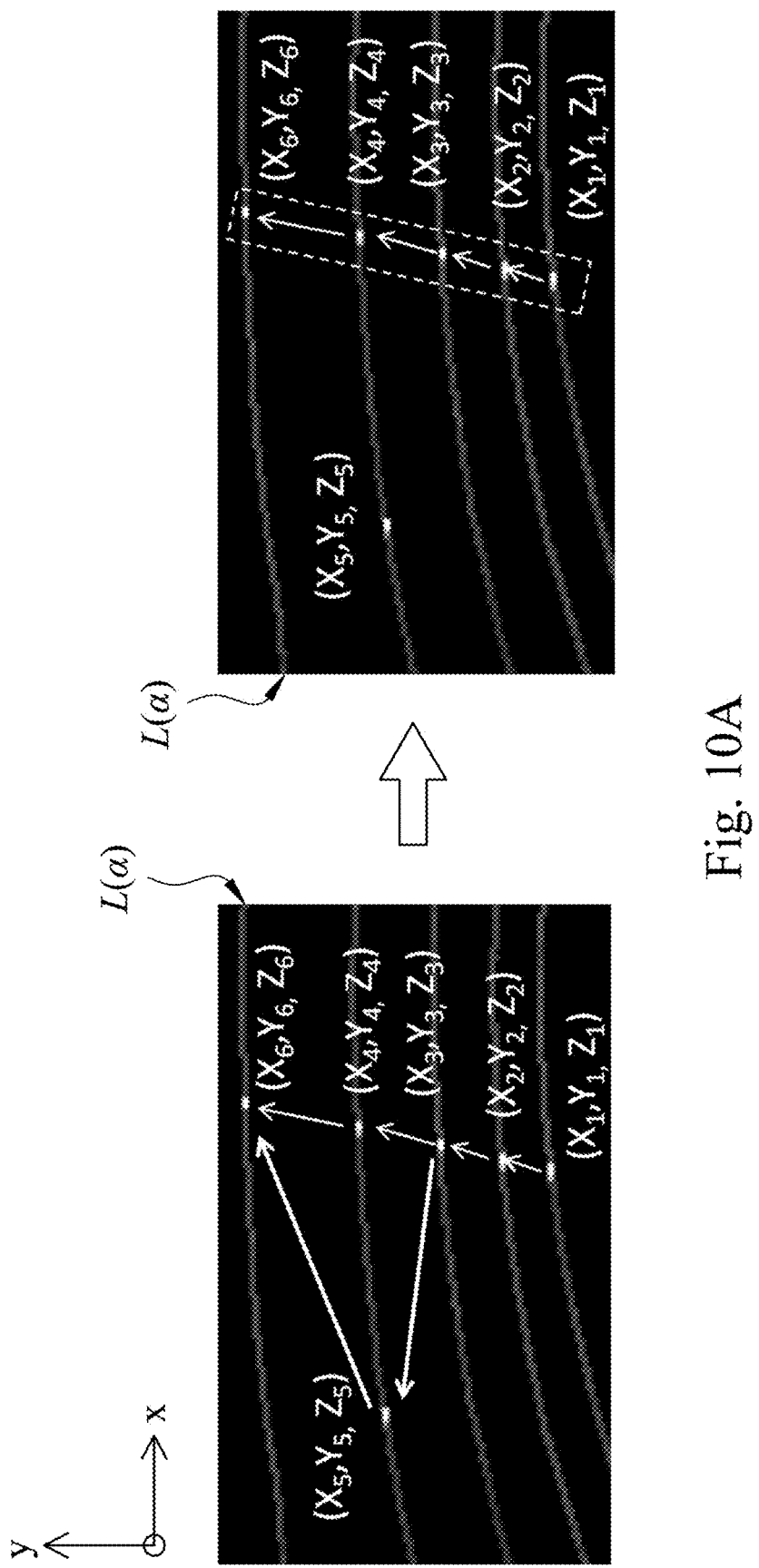
FIG. 10A shows a schematic view of a continuity analyzing step of FIG. 5.
Figure 10B:
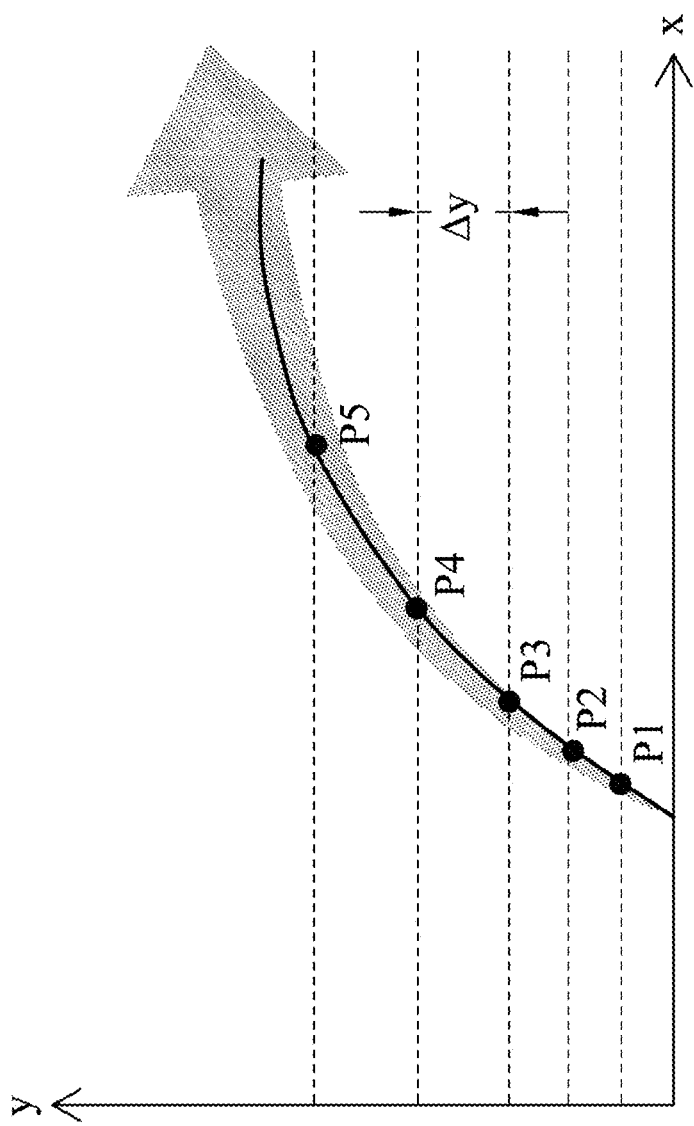
FIG. 10B shows a schematic view of a searching range of a plurality of same lane stripe points of FIG. 10A.
Figure 11:
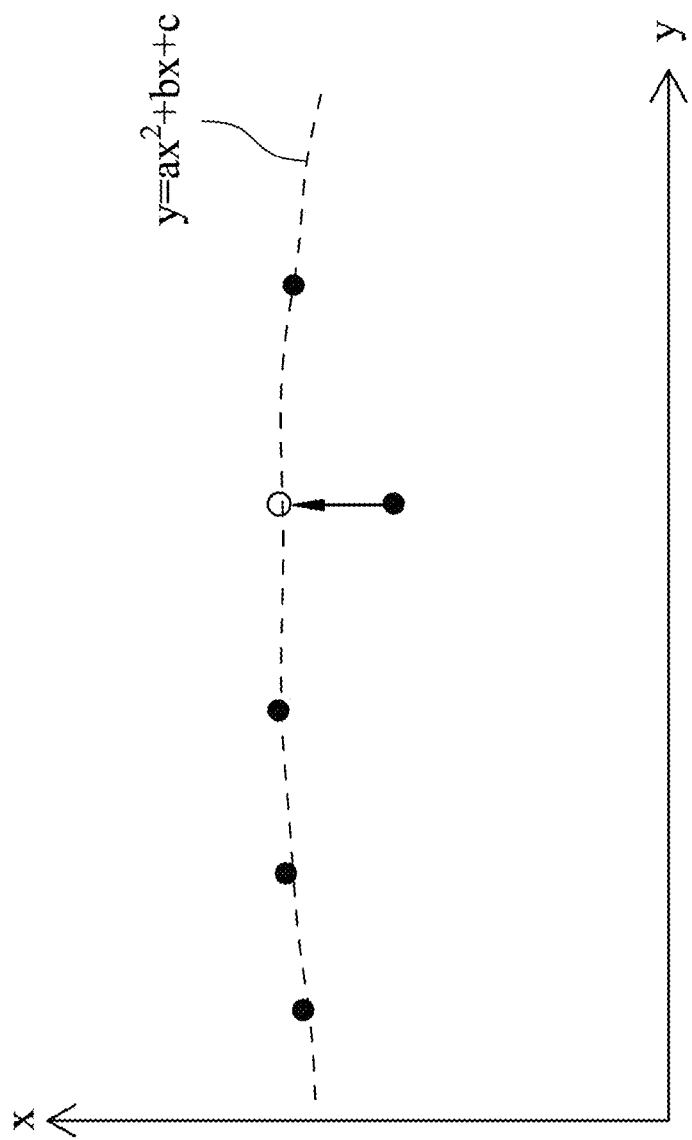
FIG. 11 shows a schematic view of a lane stripe fitting step of FIG. 5.

FIG. 5 shows a flow chart of a lane stripe detecting method 100a based on a three-dimensional LIDAR according to a second embodiment of the present disclosure. FIG. 6 shows a schematic view of a point cloud height filtering step S22 of FIG. 5. FIG. 7 shows a schematic view of a thresholding method in a point cloud intensity judging step S2322 of FIG. 5. FIG. 8 shows a schematic view of a threshold value $T_n$ of each of a plurality of scan lines L(α) in a point cloud intensity judging step S2322 of FIG. 5. FIG. 9A shows a schematic view of a single lane stripe 122a of a lane stripe 122 in a lane stripe width filtering step S234 of FIG. 5. FIG. 9B shows a schematic view of a dual lane stripe 122b of the lane stripe 122 in the lane stripe width filtering step S234 of FIG. 5. FIG. 10A shows a schematic view of a continuity analyzing step S242 of FIG. 5. FIG. 10B shows a schematic view of a searching range of a plurality of same lane stripe points Pn of FIG. 10A. FIG. 11 shows a schematic view of a lane stripe fitting step S244 of FIG. 5. In FIGS. 2, 3, 4, 5, 6, 7, 8, 9A, 9B, 10A, 10B and 11, the lane stripe detecting method 100a based on a three-dimensional LIDAR is for detecting a lane stripe 122 of the road surface 120 around the vehicle 110. The road surface 120 includes the lane stripe 122 and a ground surface 124. The lane stripe detecting method 100a based on a three-dimensional LIDAR includes a data acquisition transforming step S21, the point cloud height filtering step S22, a horizontal layer lane stripe judging step S23 and a vertical layer lane stripe judging step S24.

The data acquisition transforming step S21 is for obtaining a plurality of three-dimensional LIDAR scan point coordinates (x',y',z') of the road surface 120 via the three-dimensional LIDAR sensor 130. The three-dimensional LIDAR sensor 130 is disposed on the vehicle 110 and corresponding to the three-dimensional LIDAR scan point coordinates (x',y',z'). Then, the data acquisition transforming step S12 is for transforming the three-dimensional LIDAR scan point coordinates (x',y',z') into a plurality of vehicle scan point coordinates (x,y,z) according to a coordinate transformation equation. The vehicle scan point coordinates (x,y,z) are corresponding to the vehicle 110 and divided into a plurality of scan lines L(α), and each of the scan lines L(α) has a plurality of scan points P(α,i). In detail, the data acquisition transforming step S21 includes a point cloud data acquisition step S212 and a data coordinate transforming step S214. The point cloud data acquisition step S212 is for driving the three-dimensional LIDAR sensor 130 to emit a plurality of laser-emitting points to the road surface 120, and then the three-dimensional LIDAR sensor 130 receives the laser-emitting points reflected from the road surface 120 to generate a plurality of three-dimensional LIDAR sensor scan point coordinates and transmits the three-dimensional LIDAR sensor scan point coordinates (x',y',z') to a point cloud processing unit 140. The three-dimensional LIDAR sensor 130 is disposed the vehicle 110. The three-dimensional LIDAR sensor 130 has a horizontal viewing angle, a vertical viewing angle α and a rotational frequency. The horizontal viewing angle represents a field-of-view (FOV) in a horizontal direction. The vertical viewing angle α represents the field-of-view in a vertical direction. In one embodiment, the three-dimensional LIDAR sensor 130 has 16 laser beams and can be rotated 360 degrees, i.e., the horizontal viewing angle is equal to 360 degrees. The three-dimensional LIDAR sensor 130 is a low resolution sensor. Each of the vertical viewing angles α is equal to or greater than −15 degrees and is equal to or smaller than +15 degrees. The rotational frequency is equal to 10 Hz. The three-dimensional LIDAR sensor 130 is signally connected to the point cloud processing unit 140 through an Ethernet cable. Each spin of the three-dimensional LIDAR sensor can generate the three-dimensional LIDAR sensor scan point coordinates (x',y',z') of the road surface 120. Moreover, the vertical viewing angles α of the three-dimensional LIDAR sensor 130 using 16 laser beams are set between −15 degrees and +15 degrees. In other words, the vertical viewing angles α are −15 degrees, −13 degrees, −11 degrees, −9 degrees, −7 degrees, −5 degrees, −3 degrees, −1 degrees, +1 degrees, +3 degrees, +5 degrees, +7 degrees, +9 degrees, +11 degrees, +13 degrees and +15 degrees, respectively. In addition, the point cloud processing unit 140 may be a personal computer, an electronic control unit (ECU), a microprocessor, a mobile device or other electronic controllers for use in the vehicle. In one embodiment of the present disclosure, the point cloud processing unit 140 utilizes the personal computer for processing.

The data coordinate transforming step S214 is for utilizing the point cloud processing unit 140 to transform the three-dimensional LIDAR sensor scan point coordinates (x',y',z') into the vehicle scan point coordinates (x,y,z) according to the coordinate transformation equation. The coordinate transformation equation includes a vertical viewing angle α (i.e., a pitch angle), a roll angle β, a height h of the three-dimensional LIDAR sensor 130 above the road surface 120, the three-dimensional LIDAR sensor scan point coordinates (x',y',z') and the vehicle scan point coordinates (x,y,z). The coordinate transformation equation is described as follows:

$$\begin{bmatrix} x \\ y \\ z \end{bmatrix} = \begin{bmatrix} 0 \\ 0 \\ h \end{bmatrix} + \begin{bmatrix} \cos\beta & 0 & \sin\beta \\ 0 & 1 & 0 \\ -\sin\beta & 0 & \cos\beta \end{bmatrix} \times \begin{bmatrix} 1 & 0 & 0 \\ 0 & \cos\alpha & \sin\alpha \\ 0 & -\sin\alpha & \cos\alpha \end{bmatrix} \times \begin{bmatrix} x' \\ y' \\ z' \end{bmatrix}. \quad (1)$$

The point cloud height filtering step S22 is for generating a filtering line FL according to a filtering line height value $Z_{thres}$. The vehicle scan point coordinates (x,y,z) include a plurality of vehicle coordinate height values z, and then the point cloud height filtering step S22 is for removing a part of the scan points $P(\alpha,i)$ if the vehicle coordinate height values z of the part of the scan points $P(\alpha,i)$ are greater than the filtering line height value $Z_{thres}$ according to the filtering line FL. The filtering line height value $Z_{thres}$ is greater than 0 cm and smaller than or equal to 5 cm. More preferably, the filtering line height value $Z_{thres}$ is greater than 0 cm and smaller than or equal to 2 cm. Therefore, the point cloud height filtering step S22 of the present disclosure can remove redundant scan points to greatly reduce the calculation time and increase the operational efficiency.

The horizontal layer lane stripe judging step S23 includes a stripe point cloud searching step S232 and a lane stripe width filtering step S234. The stripe point cloud searching step S232 includes a point cloud intensity judging step S2322. The point cloud intensity judging step S2322 is for calculating intensity of the scan points $P(\alpha,i)$ of each of the scan lines $L(\alpha)$ to obtain a threshold value $T_n$ according to a thresholding method and judging whether each of the scan points $P(\alpha,i)$ is a horizontal stripe point $Phs(\alpha,i)$ or a non-horizontal stripe point $Pnhs(\alpha,i)$ according to the threshold value $T_n$ of each of the scan lines $L(\alpha)$. At least two of the threshold values $T_n$ of the scan lines $L(\alpha)$ are different from each other. The horizontal stripe point $Phs(\alpha,i)$ is corresponding to the lane stripe 122 of the road surface 120. The non-horizontal stripe point $Pnhs(\alpha,i)$ is corresponding to the ground surface 124 of the road surface 120. Accordingly, the scan points $P(\alpha,i)$ of each of the scan lines $L(\alpha)$ can be judged according to the threshold value $T_n$ obtained by the thresholding method because of a constant distance between each horizontal layer (i.e., each of the scan lines $L(\alpha)$) and the three-dimensional LIDAR sensor 130. The judgement result is not affected by the reduced energy caused by different distances of different scan lines so as to be capable of providing a flexible threshold value to judge the scan points $P(\alpha,i)$.

The lane stripe width filtering step S234 is for analyzing the horizontal stripe points $Phs(\alpha,i)$ to obtain at least one lane stripe width $\Delta d$ and judging whether each of the horizontal stripe points $Phs(\alpha,i)$ is a lane stripe marker or a non-lane stripe marker according to a comparison result of a reasonable lane stripe width range and the at least one lane stripe width $\Delta d$. In one embodiment of the present disclosure, the horizontal stripe points $Phs(\alpha,i)$ are analyzed to obtain a lane stripe width $\Delta d$, and the reasonable lane stripe width range includes a lane stripe maximum width value dmax and a lane stripe minimum width value dmin in the lane stripe width filtering step S234. When the lane stripe width $\Delta d$ is greater than the lane stripe maximum width value dmax or less than the lane stripe minimum width value dmin, each of the horizontal stripe points $Phs(\alpha,i)$ is regarded as the non-lane stripe marker. When the lane stripe width $\Delta d$ is less than or equal to the lane stripe maximum width value dmax and greater than or equal to the lane stripe minimum width value dmin, each of the horizontal stripe points $Phs(\alpha,i)$ is regarded as a single lane stripe 122a of the lane stripe marker, as shown in FIG. 9A. In another embodiment of the present disclosure, the horizontal stripe points $Phs(\alpha,i)$ are analyzed to obtain a first lane stripe width $\Delta d1$ and a second lane stripe width $\Delta d2$, and the reasonable lane stripe width range includes a lane stripe maximum width value dmax, a lane stripe minimum width value dmin and a predetermined gap width value $d_{thres}$ in the lane stripe width filtering step S234. When the first lane stripe width $\Delta d1$ and the second lane stripe width $\Delta d2$ are both less than or equal to the lane stripe maximum width value dmax and greater than or equal to the lane stripe minimum width value dmin, and a distance $\Delta d3$ between a first part of the horizontal stripe points $Phs(\alpha,i)$ corresponding to the first lane stripe width $\Delta d1$ and a second part of the horizontal stripe points $Phs(\alpha,i)$ corresponding to the second lane stripe width $\Delta d2$ is less than or equal to the predetermined gap width value $d_{thres}$, each of the first part of the horizontal stripe points $Phs(\alpha,i)$ corresponding to the first lane stripe width $\Delta d1$ and the second part of the horizontal stripe points $Phs(\alpha,i)$ corresponding to the second lane stripe width $\Delta d2$ is regarded as a dual lane stripe 112b of the lane stripe marker, as shown in FIG. 9B. The lane stripe maximum width value dmax, the lane stripe minimum width value dmin and the predetermined gap width value $d_{thres}$ maybe 12 cm, 8 cm and 10 cm, respectively. Hence, the present disclosure can effectively and accurately remove the non-lane stripe marker of the road surface 120 via the lane stripe width filtering step S234.

The vertical layer lane stripe judging step S24 includes a continuity analyzing step S242 and a lane stripe fitting step S244. The continuity analyzing step S242 is for analyzing a slope of the horizontal stripe points $Phs(\alpha,i)$ of any two adjacent ones of the scan lines $L(\alpha)$ and judging whether each of the horizontal stripe points $Phs(\alpha,i)$ is a same lane stripe point Pn or a different lane stripe point according to a comparison result of a predetermined threshold slope and the slope. The same lane stripe point Pn is corresponding to the lane stripe 122, as shown in FIGS. 10A and 10B. In detail, the horizontal stripe points $Phs(\alpha,i)$ can be represented as coordinate values $(X_1,Y_1,Z_1)$, $(X_2,Y_2,Z_2)$, $(X_3,Y_3,Z_3)$, $(X_4,Y_4,Y_4)$, $(X_5,Y_5,Z_5)$, $(X_6,Y_6,Z_6)$ in FIG. 10A. In a vertical direction (y-axis direction), the distribution of the point cloud data is not continuous, and the density of the scan lines $L(\alpha)$ is sparse. When a distance between one of the scan lines $L(\alpha)$ and the vehicle 110 is increased, a distance between the one of the scan lines $L(\alpha)$ and another one of the scan lines $L(\alpha)$ adjacent thereto is increased. Therefore, the present disclosure utilizes the continuity analyzing step S242 to judge whether each of the horizontal stripe points $Phs(\alpha,i)$ of each of the scan lines $L(\alpha)$ is a same lane stripe point Pn or not. The continuity analyzing step S242 may analyze the slopes and then determine a horizontal searching range $\Delta x$ and a vertical searching range $\Delta y$ according to the slopes. The horizontal searching range $\Delta x$ is determined according to x-axis coordinates of the same lane stripe points Pn of the two adjacent ones of the scan lines $L(\alpha)$, and the horizontal searching range $\Delta x$ is changed according to a variation of the x-axis coordinates in an x-axis direction. For example, the continuity analyzing step S242 searches for a next same lane stripe point Pn+1 according to a current same lane stripe point Pn in a positive x-axis direction, as shown in FIG. 10B. The vertical searching range $\Delta y$ is determined according to a distance between the two adjacent ones of the scan lines $L(\alpha)$, i.e., $\Delta y = h \times \tan(\alpha+2) - h \times \tan(\alpha)$, wherein h represents the height of the three-dimensional LIDAR sensor 130 above the road surface 120, and a represents the vertical viewing angle, as shown in FIG. 2. Finally, the continuity analyzing step S242 determines that each of the horizontal stripe points Phs($\alpha$,i) is a same lane stripe point Pn or a different lane stripe point via the horizontal searching range $\Delta x$ and the vertical searching range $\Delta y$. In FIG. 10B, the same lane stripe points Pn of the scan lines $L(\alpha)$ are corresponding to the coordinate values $(X_1,Y_1,Z_1)$, $(X_2,Y_2,Z_2)$, $(X_3,Y_3,Z_3)$, $(X_4,Y_4,Y_4)$, $(X_6,Y_6,Z_6)$, and the different lane stripe point is corresponding to the coordinate value $(X_5,Y_5,Z_5)$.

The lane stripe fitting step S244 is for fitting a plurality of coordinate values of the same lane stripe points Pn of the horizontal stripe points Phs($\alpha$,i) to generate a predicted vertical layer lane stripe according to a lane stripe fitting equation, and the predicted vertical layer lane stripe is corresponding to the lane stripe 122. In FIGS. 10A and 10B, the lane stripe fitting step S244 is for fitting the coordinate values $(X_1,Y_1,Z_1)$, $(X_2,Y_2,Z_2)$, $(X_3,Y_3,Z_3)$, $(X_4,Y_4,Y_4)$, $(X_6,Y_6,Z_6)$ of the same lane stripe points P1, P2, P3, P4, P5 of the horizontal stripe points Phs($\alpha$,i) to generate the predicted vertical layer lane stripe (i.e., $y=ax^2+bx+c$) according to the lane stripe fitting equation. An interpolation technique can be used in the lane stripe fitting step S244, as shown in FIG. 11. A mathematical model applied to the lane stripe may be a first-order linear equation, a second-order parabolic equation, a second-order hyperbolic equation or a third-order equation. Because the three-dimensional LIDAR sensor 130 has 16 beams in this embodiment, the mathematical model applied to the lane stripe is suitable for the second-order parabolic equation. When a focal length is approximately equal to 0, the lane stripe can be regarded as a straight line condition, so that the mathematical model applied to the lane stripe is suitable for the first-order linear equation. When the vehicle is located on a curved road, the mathematical model applied to the lane stripe is suitable for the second-order parabolic equation. Accordingly, the lane stripe detecting method 100a based on the three-dimensional LIDAR of the present disclosure utilizes original point cloud data to detect the lane stripe 122 in an autonomous driving system so as to assist an autonomous driving vehicle (e.g., the vehicle 110) to improve the safety of the autonomous driving. In addition, the hierarchical point cloud intensity judgement and the specific lane stripe width filtering operation of the horizontal layer lane stripe judging step S23 combined with the continuity analysis and the lane stripe fitting operation of the vertical layer lane stripe judging step S24 can allow the lane stripe detecting method 100a to be more flexible and greatly improve the correctness of the judgement.

Figure 12:
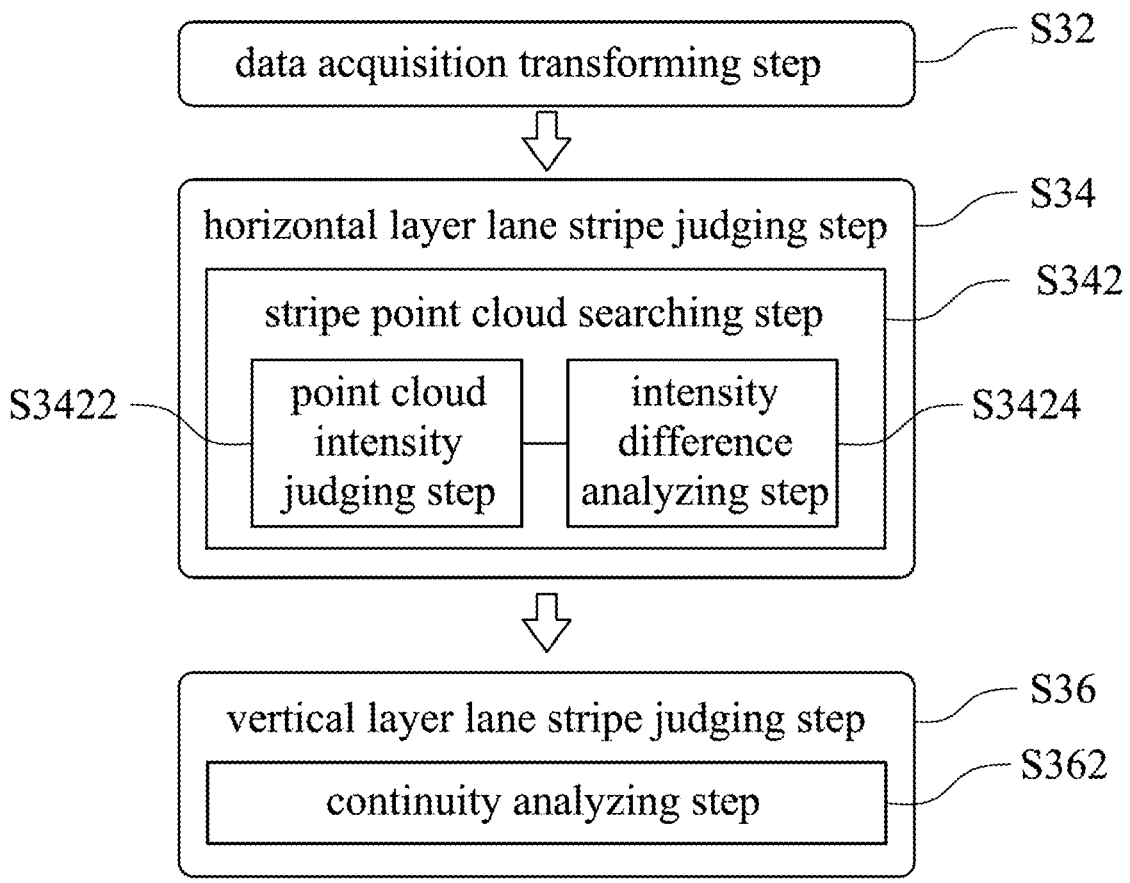
FIG. 12 shows a flow chart of a lane stripe detecting method based on a three-dimensional LIDAR according to a third embodiment of the present disclosure.
Figure 13:
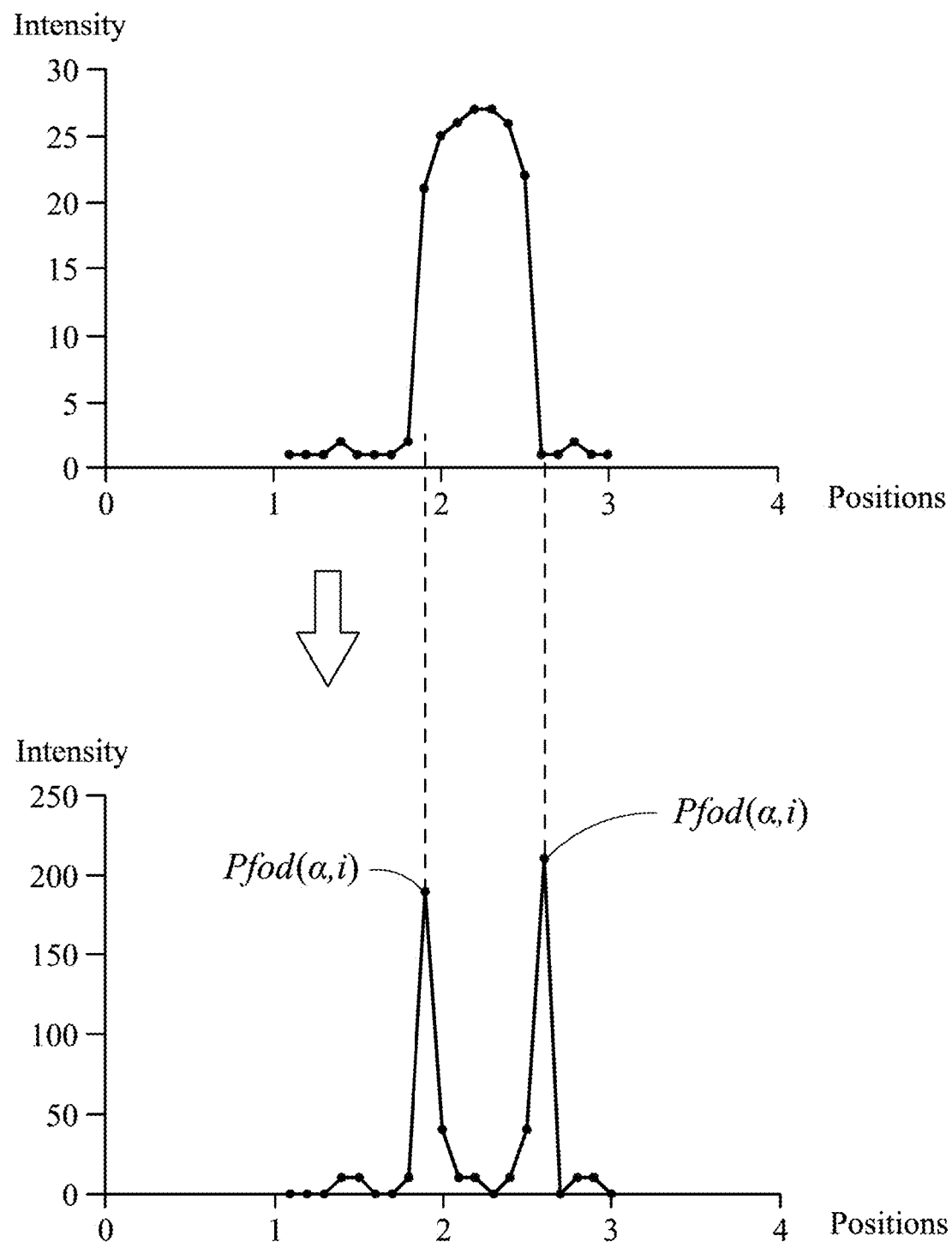
FIG. 13 shows a schematic view of an intensity difference analyzing step of FIG. 12.

FIG. 12 shows a flow chart of a lane stripe detecting method 100b based on a three-dimensional LIDAR according to a third embodiment of the present disclosure. FIG. 13 shows a schematic view of an intensity difference analyzing step S3424 of FIG. 12. The lane stripe detecting method 100b based on the three-dimensional LIDAR includes a data acquisition transforming step S32, a horizontal layer lane stripe judging step S34 and a vertical layer lane stripe judging step S36.

In FIG. 12, the detail of the data acquisition transforming step S32 and a point cloud intensity judging step S3422 of a stripe point cloud searching step S342 of the horizontal layer lane stripe judging step S34 is the same as the embodiments of the data acquisition transforming step S12 and the point cloud intensity judging step S1422 of the horizontal layer lane stripe judging step S14 of FIG. 1, and will not be described again herein. In FIG. 12, the stripe point cloud searching step S342 of the horizontal layer lane stripe judging step S34 further includes an intensity difference analyzing step S3424. The intensity difference analyzing step S3424 is for analyzing intensity of the scan points $P(\alpha,i)$ of each of the scan lines $L(\alpha)$ to obtain a plurality of intensity difference values of any two adjacent ones of the scan points $P(\alpha,i)$ according to an edge detecting method and judging whether each of the scan points $P(\alpha,i)$ is a horizontal stripe edge point Pfod($\alpha$,i) or a non-horizontal stripe edge point according to a comparison result of a predetermined difference value and the intensity difference values, and then determining a plurality of horizontal point cloud stripe points according to the horizontal stripe points Phs($\alpha$,i) and the horizontal stripe edge points Pfod($\alpha$,i) of each of the scan lines $L(\alpha)$. In one embodiment of the present disclosure, the edge detecting method is a first-order differential calculation, so that the intensity difference analyzing step S3424 performs the first-order differential calculation of intensity of the scan points $P(\alpha,i)$ to obtain positions of the horizontal stripe edge points Pfod($\alpha$,i) having higher intensity difference values, as shown in FIG. 13. In addition, the vertical layer lane stripe judging step S36 includes a continuity analyzing step S362. The continuity analyzing step S362 is for analyzing a slope of the horizontal point cloud stripe points of any two adjacent ones of the scan lines $L(\alpha)$ and judging whether each of the horizontal point cloud stripe points is a same lane stripe point Pn or a different lane stripe point according to a comparison result of a predetermined threshold slope and the slope. The same lane stripe point Pn is corresponding to the lane stripe 122. Therefore, the intensity difference analyzing step S3424 of the present disclosure utilizes the first-order differential calculation to find peak values, and positions of the peak values can be obtained intuitively without executing the subtraction of intensity. Each of the scan lines $L(\alpha)$ is calculated by the edge detecting method so as to avoid the problem that a conventional image lane stripe detecting method cannot obtain clear edge values when light in a far position is weak. Additionally, the point cloud data is discontinuous, and the edge detecting method of the present disclosure can be performed to clearly obtain the higher intensity difference values (i.e., the horizontal stripe edge points Pfod($\alpha$,i)). However, in the conventional image lane stripe detecting method, each pixel of an image is continuous, and the edges are blurry easily, so that the edge detecting method cannot clearly obtain the higher intensity difference values and is not suitable for being applied to the conventional image lane stripe detecting method.

Figure 14:
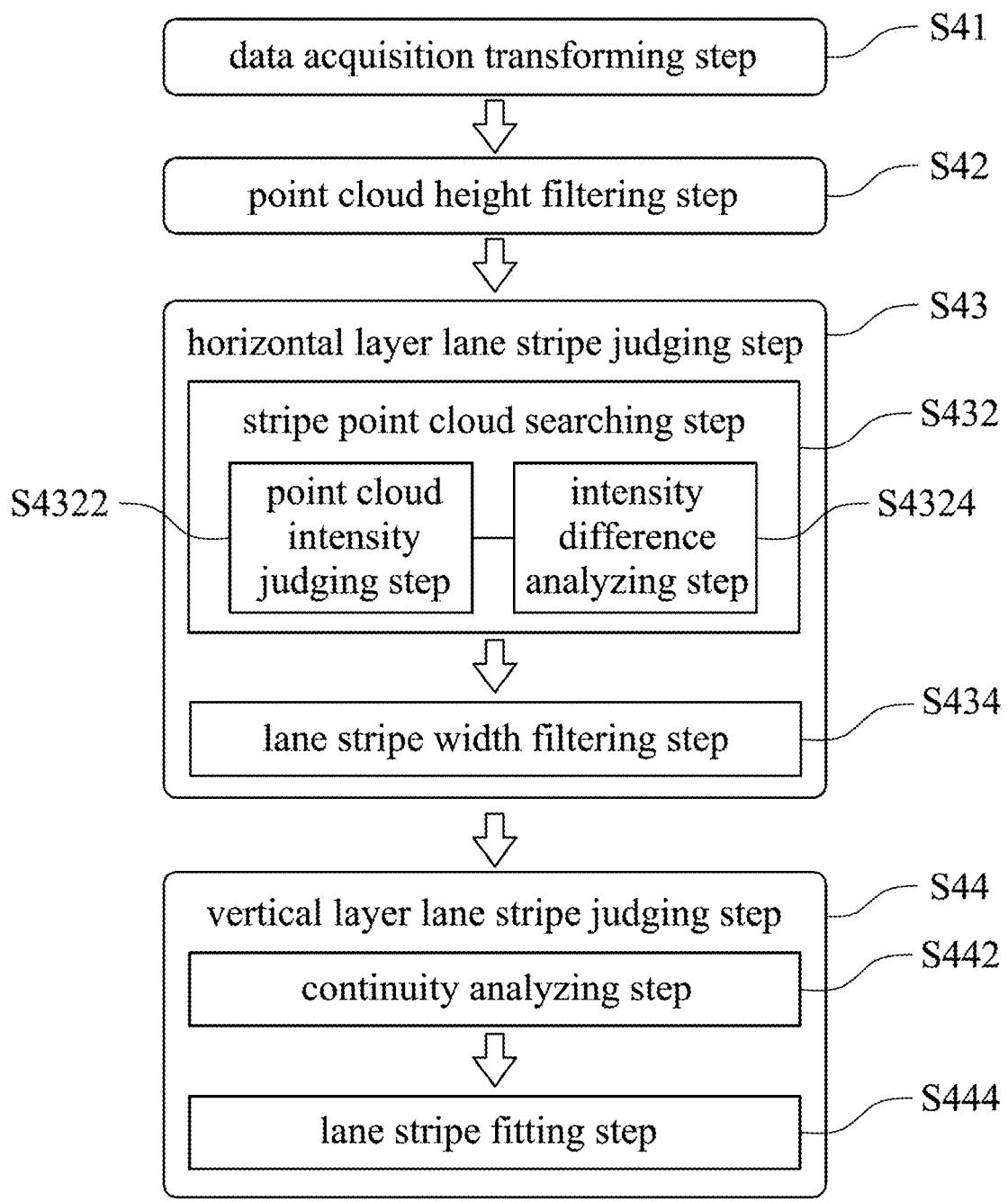
FIG. 14 shows a flow chart of a lane stripe detecting method based on a three-dimensional LIDAR according to a fourth embodiment of the present disclosure.
Figure 15:
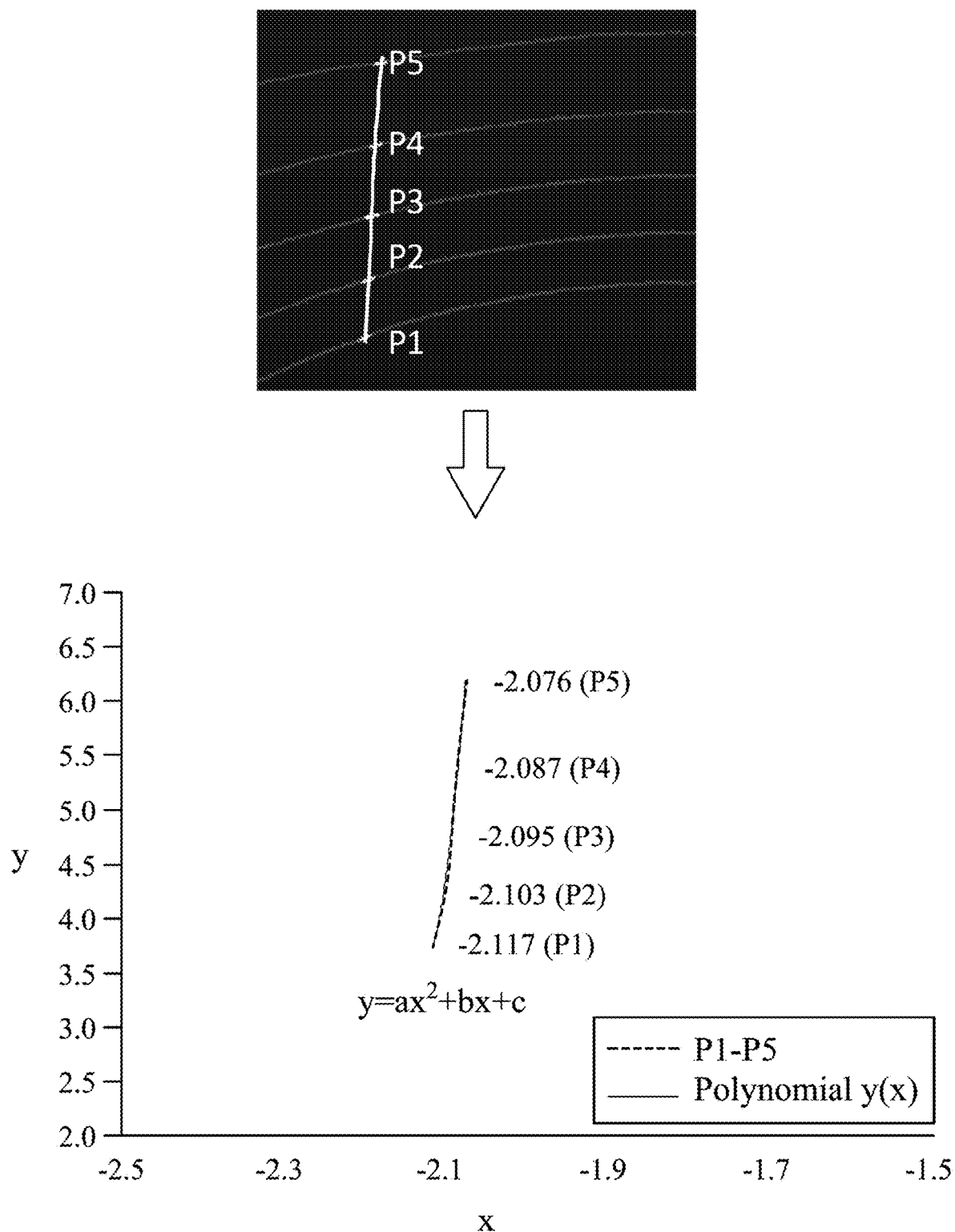
FIG. 15 shows a schematic view of a vertical layer lane stripe judging step of FIG. 14.

FIG. 14 shows a flow chart of a lane stripe detecting method 100c based on a three-dimensional LIDAR according to a fourth embodiment of the present disclosure. FIG. 15 shows a schematic view of a vertical layer lane stripe judging step S44 of FIG. 14. In FIGS. 13, 14 and 15, the lane stripe detecting method 100c based on the three-dimensional LIDAR includes a data acquisition transforming step S41, a point cloud height filtering step S42, a horizontal layer lane stripe judging step S43 and the vertical layer lane stripe judging step S44.

In FIG. 14, the detail of the data acquisition transforming step S41, the point cloud height filtering step S42, a point cloud intensity judging step S4322 of a stripe point cloud searching step S432 of the horizontal layer lane stripe judging step S43 and the vertical layer lane stripe judging step S44 is the same as the embodiments of the data acquisition transforming step S21, the point cloud height filtering step S22, the point cloud intensity judging step S2322 of the stripe point cloud searching step S232 of the horizontal layer lane stripe judging step S23 and the vertical layer lane stripe judging step S24 of FIG. 5, and will not be described again herein. In FIG. 14, the stripe point cloud searching step S432 of the horizontal layer lane stripe judging step S43 further includes an intensity difference analyzing step S4324. The intensity difference analyzing step S4324 is for analyzing intensity of the scan points $P(\alpha,i)$ of each of the scan lines $L(\alpha)$ to obtain a plurality of intensity difference values of any two adjacent ones of the scan points $P(\alpha,i)$ according to an edge detecting method and judging whether each of the scan points $P(\alpha,i)$ is a horizontal stripe edge point $Pfod(\alpha,i)$ or a non-horizontal stripe edge point according to a comparison result of a predetermined difference value and the intensity difference values, and then determining a plurality of horizontal point cloud stripe points according to the horizontal stripe points $Phs(\alpha,i)$ and the horizontal stripe edge points $Pfod(\alpha,i)$ of each of the scan lines $L(\alpha)$. In one embodiment of the present disclosure, the edge detecting method is a first-order differential calculation. Furthermore, a lane stripe width filtering step S434 of the horizontal layer lane stripe judging step S43 is for analyzing the horizontal point cloud stripe points to obtain at least one lane stripe width and judging whether each of the horizontal point cloud stripe points is a lane stripe marker or a non-lane stripe marker according to a comparison result of a reasonable lane stripe width range and the at least one lane stripe width. In one embodiment, the lane stripe width filtering step S434 of the present disclosure can effectively and accurately remove the non-lane stripe marker of the road surface 120. The detail of the lane stripe width filtering step S434 is the same as the embodiments of the lane stripe width filtering step S234 of FIG. 5, and will not be described again herein. Finally, the horizontal point cloud stripe points corresponding to the lane stripe markers are utilized for fitting a plurality of coordinate values of the same lane stripe points Pn of the lane stripe markers of the horizontal point cloud stripe points to generate a predicted vertical layer lane stripe via the vertical layer lane stripe judging step S44. The predicted vertical layer lane stripe is corresponding to the lane stripe 122. For example, Table 1 and FIG. 15 show the coordinate values of the same lane stripe points P1, P2, P3, P4, P5 of the lane stripe markers and the slopes $\Delta y/\Delta x$ of adjacent two coordinate values. In the embodiment of the present disclosure, a continuity analyzing step S242 of the vertical layer lane stripe judging step S44 may set a predetermined threshold slope to remove any unreasonable slope $\Delta y/\Delta x$. A lane stripe fitting step S444 of the vertical layer lane stripe judging step S44 may be for fitting the coordinate values of the same lane stripe points P1, P2, P3, P4, P5 of the lane stripe markers to generate the predicted vertical layer lane stripe (i.e., $y=ax^2+bx+c$) according to the lane stripe fitting equation. A mathematical model is a second-order parabolic equation. Therefore, the lane stripe detecting method 100c based on the three-dimensional LIDAR of the present disclosure utilizes the searching range of the continuity analyzing step S442 to reduce searching time and utilizes the lane stripe fitting step S444 to fit the same lane stripe points Pn in a continuity condition to generate the predicted vertical layer lane stripe with higher correctness and accuracy. Furthermore, the continuity analyzing step S442 can set the horizontal searching range $\Delta x$ and the vertical searching range $\Delta y$ according to the height h of the three-dimensional LIDAR sensor 130 above the road surface 120, the vertical viewing angle $\alpha$ and the slopes, and search the same lane stripe points Pn from a lower layer to an upper layer according to the horizontal searching range $\Delta x$ and the vertical searching range $\Delta y$ so as to remove the different lane stripe point and improve the correctness and the accuracy of detection.

TABLE 1

|   | P1 | P2 | P3 | P4 | P5 |
|---|---|---|---|---|---|
| x | −2.117 | −2.103 | −2.095 | −2.087 | −2.076 |
| y | 3.754 | 4.217 | 4.756 | 5.388 | 6.190 |
| z | −1.155 | −1.088 | −1.010 | −0.915 | −0.862 |
| $\Delta y/\Delta x$ |  | 33.071 | 67.375 | 79.000 | 72.909 |

Figure 16:
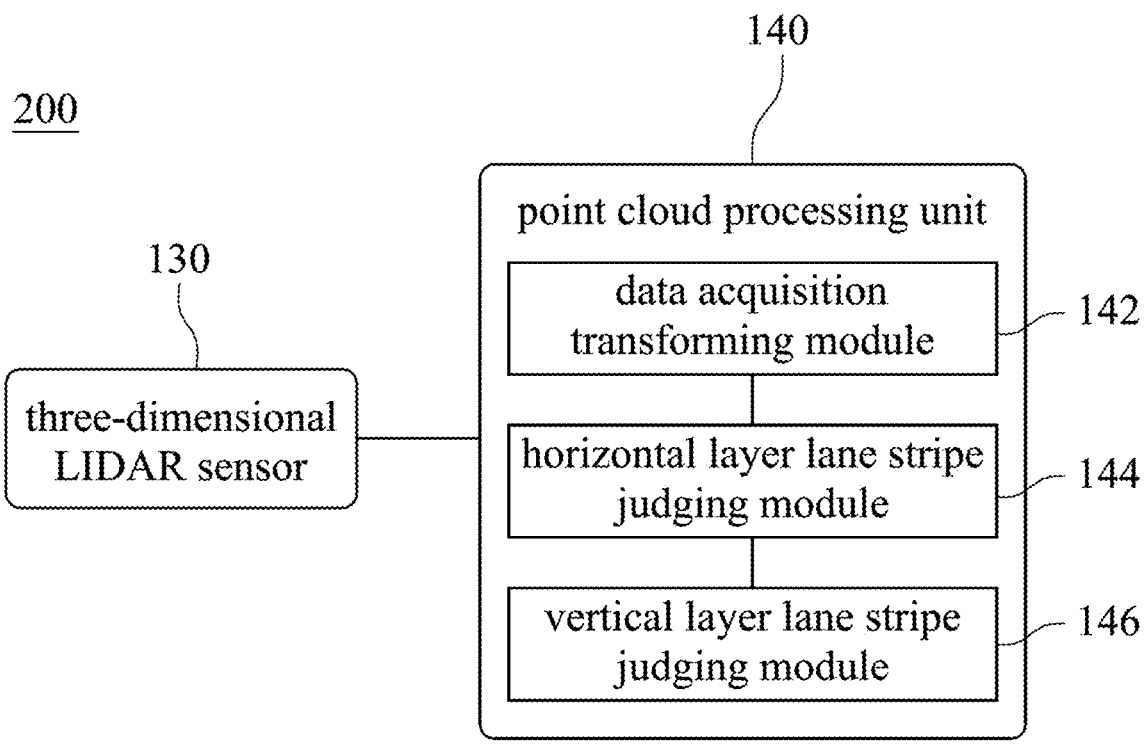
FIG. 16 shows a block diagram of a lane stripe detecting system based on a three-dimensional LIDAR according to one embodiment of the present disclosure.

FIG. 16 shows a block diagram of a lane stripe detecting system 200 based on a three-dimensional LIDAR according to one embodiment of the present disclosure. In FIGS. 1, 5, 12, 14 and 16, the lane stripe detecting system 200 based on the three-dimensional LIDAR is configured to detect a lane stripe 122 of a road surface 120 around a vehicle 110, and the lane stripe detecting system 200 based on the three-dimensional LIDAR includes a three-dimensional LIDAR sensor 130 and a point cloud processing unit 140.

The detail of the three-dimensional LIDAR sensor 130 is the same as the embodiment of the three-dimensional LIDAR sensor 130 of the data acquisition transforming step S21 of FIG. 5, and will not be described again herein. The point cloud processing unit 140 is signally connected to the three-dimensional LIDAR sensor 130 and includes a data acquisition transforming module 142, a horizontal layer lane stripe judging module 144 and a vertical layer lane stripe judging module 146. The data acquisition transforming module 142 is signally connected to the three-dimensional LIDAR sensor 130. The data acquisition transforming module 142 is configured to transform the three-dimensional LIDAR scan point coordinates (x',y',z') to a plurality of vehicle scan point coordinates (x,y,z) according to a coordinate transformation equation. The vehicle scan point coordinates (x,y,z) are corresponding to the vehicle 110 and divided into a plurality of scan lines $L(\alpha)$, and each of the scan lines $L(\alpha)$ has a plurality of scan points $P(\alpha,i)$. The data acquisition transforming module 142 is configured to perform the data acquisition transforming steps S12, S21, S32, S41. The horizontal layer lane stripe judging module 144 is signally connected to the data acquisition transforming module 142. The horizontal layer lane stripe judging module 144 is configured to calculate intensity of the scan points $P(\alpha,i)$ of each of the scan lines $L(\alpha)$ to obtain a threshold value $T_n$ according to a thresholding method and judge whether each of the scan points $P(\alpha,i)$ is a horizontal stripe point $Phs(\alpha,i)$ or a non-horizontal stripe point $Pnhs(\alpha,i)$ according to the threshold value $T_n$ of each of the scan lines $L(\alpha)$. At least two of the threshold values $T_n$ of the scan lines $L(\alpha)$ are different from each other. The horizontal layer lane stripe judging module 144 is configured to perform the horizontal layer lane stripe judging steps S14, S23, S34, S43. The vertical layer lane stripe judging module 146 is signally connected to the horizontal layer lane stripe judging module 144. The vertical layer lane stripe judging module 146 is configured to analyze a slope of the horizontal stripe points $Phs(\alpha,i)$ of any two adjacent ones of the scan lines $L(\alpha)$ and judge whether each of the horizontal stripe points $Phs(\alpha,i)$ is a same lane stripe point Pn or a different lane stripe point according to a comparison result of a predetermined threshold slope and the slope. The same lane stripe point Pn is corresponding to the lane stripe 122. The vertical layer lane stripe judging module 146 is configured to perform the vertical layer lane stripe judging step S16, S24, S36, S44. Accordingly, the lane stripe detecting system 200 based on the three-dimensional LIDAR of the present disclosure can assist an autonomous driving vehicle to improve the safety of the autonomous driving and the application of the point cloud data. In addition, the horizontal layer stripe judging module 144 and the vertical layer lane stripe judging module 146 of the present disclosure can improve the correctness and the accuracy of detection.

According to the aforementioned embodiments and examples, the advantages of the present disclosure are described as follows.

1. The lane stripe detecting method based on the three-dimensional LIDAR of the present disclosure utilizes original point cloud data to detect the lane stripe in an autonomous driving system so as to assist an autonomous driving vehicle to improve the safety of the autonomous driving and the application of the point cloud data. Moreover, as compared with the conventional image lane stripe detecting method, the present disclosure utilizes the horizontal layer lane stripe judging step and the vertical layer lane stripe judging step to greatly improve the correctness and the accuracy of detection based on no influences of external ambient light and the use of the low resolution LIDAR sensor.

2. The hierarchical point cloud intensity judgement and the specific lane stripe width filtering operation of the horizontal layer lane stripe judging step combined with the continuity analysis and the lane stripe fitting operation of the vertical layer lane stripe judging step can allow the lane stripe detecting method to be more flexible.

3. The point cloud height filtering step of the present disclosure can remove redundant scan points to greatly reduce the calculation time and increase the operational efficiency.

4. The present disclosure can effectively and accurately remove the non-lane stripe marker of the road surface via the lane stripe width filtering step.

5. The intensity difference analyzing step of the present disclosure utilizes the first-order differential calculation to find peak values, and positions of the peak values can be obtained intuitively without executing the subtraction of intensity. Moreover, each of the scan lines is calculated by the edge detecting method so as to avoid the problem that the conventional image lane stripe detecting method cannot obtain clear the edge values when light in a far position is weak. Additionally, the point cloud data is discontinuous, and the edge detecting method of the present disclosure can be performed to clearly obtain the higher intensity difference values. However, in the conventional image lane stripe detecting method, each pixel of an image is continuous, and the edges are blurry easily, so that the edge detecting method cannot clearly obtain the higher intensity difference values and is not suitable for being applied to the conventional image lane stripe detecting method.

6. The continuity analyzing step of the present disclosure can set the horizontal searching range and the vertical searching range according to the height of the three-dimensional LIDAR sensor above the road surface, the vertical viewing angle and the slopes, and search the same lane stripe points from a lower layer to an upper layer according to the horizontal searching range and the vertical searching range so as to remove the different lane stripe point and improve the correctness and the accuracy of detection.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A lane stripe detecting method based on a three-dimensional LIDAR, which is for detecting a lane stripe of a road surface around a vehicle, the lane stripe detecting method comprising:
   providing a data acquisition transforming step, wherein the data acquisition transforming step is for obtaining a plurality of three-dimensional LIDAR scan point coordinates of the road surface via a three-dimensional LIDAR sensor disposed on the vehicle, and then transforming the three-dimensional LIDAR scan point coordinates into a plurality of vehicle scan point coordinates according to a coordinate transformation equation, the vehicle scan point coordinates are divided into a plurality of scan lines, and each of the scan lines has a plurality of scan points;
   providing a horizontal layer lane stripe judging step, comprising:
      providing a stripe point cloud searching step, comprising:
         providing a point cloud intensity judging step, wherein the point cloud intensity judging step is for calculating intensity of the scan points of each of the scan lines to obtain a threshold value according to a thresholding method and judging whether each of the scan points is a horizontal stripe point or a non-horizontal stripe point according to the threshold value of each of the scan lines, and at least two of the threshold values of the scan lines are different from each other; and
   providing a vertical layer lane stripe judging step, comprising:
      providing a continuity analyzing step, wherein the continuity analyzing step is for analyzing a slope of the horizontal stripe points of any two adjacent ones of the scan lines and judging whether each of the horizontal stripe points is a same lane stripe point or a different lane stripe point according to a comparison result of a predetermined threshold slope and the slope, and the same lane stripe point is corresponding to the lane stripe.

2. The lane stripe detecting method of claim 1, wherein the data acquisition transforming step comprises:
   providing a point cloud data acquisition step, wherein the point cloud data acquisition step is for driving the three-dimensional LIDAR sensor to emit a plurality of laser-emitting points to the road surface, and then the three-dimensional LIDAR sensor receives the laser-emitting points reflected from the road surface to generate a plurality of three-dimensional LIDAR sensor scan point coordinates and transmits the three-dimensional LIDAR sensor scan point coordinates to a point cloud processing unit; and
   providing a data coordinate transforming step, wherein the data coordinate transforming step is for utilizing the point cloud processing unit to transform the three-dimensional LIDAR sensor scan point coordinates to the vehicle scan point coordinates according to the coordinate transformation equation.

3. The lane stripe detecting method of claim 1, wherein the coordinate transformation equation comprises a vertical viewing angle, a roll angle, a height of the three-dimensional LIDAR sensor above the road surface, the three-dimensional LIDAR sensor scan point coordinates and the vehicle scan point coordinates, the vertical viewing angle is represented as α, the roll angle is represented as β, the height of the three-dimensional LIDAR sensor above the road surface is represented as h, the three-dimensional LIDAR sensor scan point coordinates are represented as (x',y',z'), the vehicle scan point coordinates are represented as (x,y,z), and the coordinate transformation equation is described as follows:

$$\begin{bmatrix} x \\ y \\ z \end{bmatrix} = \begin{bmatrix} 0 \\ 0 \\ h \end{bmatrix} + \begin{bmatrix} \cos\beta & 0 & \sin\beta \\ 0 & 1 & 0 \\ -\sin\beta & 0 & \cos\beta \end{bmatrix} \times \begin{bmatrix} 1 & 0 & 0 \\ 0 & \cos\alpha & \sin\alpha \\ 0 & -\sin\alpha & \cos\alpha \end{bmatrix} \times \begin{bmatrix} x' \\ y' \\ z' \end{bmatrix}.$$

4. The lane stripe detecting method of claim 1, further comprising:
providing a point cloud height filtering step, wherein the point cloud height filtering step is for generating a filtering line according to a filtering line height value, the vehicle scan point coordinates comprises a plurality of vehicle coordinate height values, and then the point cloud height filtering step is for removing a part of the scan points if the vehicle coordinate height values of the part of the scan points are greater than the filtering line height value according to the filtering line.

5. The lane stripe detecting method of claim 1, wherein the horizontal layer lane stripe judging step further comprises:
providing a lane stripe width filtering step, wherein the lane stripe width filtering step is for analyzing the horizontal stripe points to obtain at least one lane stripe width and judging whether each of the horizontal stripe points is a lane stripe marker or a non-lane stripe marker according to a comparison result of a reasonable lane stripe width range and the at least one lane stripe width.

6. The lane stripe detecting method of claim 5, wherein, in the lane stripe width filtering step, the reasonable lane stripe width range comprises a lane stripe maximum width value and a lane stripe minimum width value;
when the at least one lane stripe width is less than or equal to the lane stripe maximum width value and greater than or equal to the lane stripe minimum width value, each of the horizontal stripe points is regarded as a single lane stripe of the lane stripe marker;
when the at least one lane stripe width is greater than the lane stripe maximum width value or less than the lane stripe minimum width value, each of the horizontal stripe points is regarded as the non-lane stripe marker.

7. The lane stripe detecting method of claim 5, wherein, in the lane stripe width filtering step, the horizontal stripe points are analyzed to obtain a first lane stripe width and a second lane stripe width, and the reasonable lane stripe width range comprises a lane stripe maximum width value, a lane stripe minimum width value and a predetermined gap width value;
when the first lane stripe width and the second lane stripe width are both less than or equal to the lane stripe maximum width value and greater than or equal to the lane stripe minimum width value, and a distance between a first part of the horizontal stripe points corresponding to the first lane stripe width and a second part of the horizontal stripe points corresponding to the second lane stripe width is less than or equal to the predetermined gap width value, each of the first part of the horizontal stripe points corresponding to the first lane stripe width and the second part of the horizontal stripe points corresponding to the second lane stripe width is regarded as a dual lane stripe of the lane stripe marker.

8. The lane stripe detecting method of claim 1, wherein the vertical layer lane stripe judging step further comprises:
providing a lane stripe fitting step, wherein the lane stripe fitting step is for fitting a plurality of coordinate values of the same lane stripe points of the horizontal stripe points to generate a predicted vertical layer lane stripe according to a lane stripe fitting equation, and the predicted vertical layer lane stripe is corresponding to the lane stripe.

9. A lane stripe detecting method based on a three-dimensional LIDAR, which is for detecting a lane stripe of a road surface around a vehicle, the lane stripe detecting method comprising:
providing a data acquisition transforming step, wherein the data acquisition transforming step is for obtaining a plurality of three-dimensional LIDAR scan point coordinates of the road surface via a three-dimensional LIDAR sensor disposed on the vehicle, and then transforming the three-dimensional LIDAR scan point coordinates into a plurality of vehicle scan point coordinates according to a coordinate transformation equation, the vehicle scan point coordinates are divided into a plurality of scan lines, and each of the scan lines has a plurality of scan points;
providing a horizontal layer lane stripe judging step, comprising:
providing a stripe point cloud searching step, comprising:
providing a point cloud intensity judging step, wherein the point cloud intensity judging step is for calculating intensity of the scan points of each of the scan lines to obtain a threshold value according to a thresholding method and judging whether each of the scan points is a horizontal stripe point or a non-horizontal stripe point according to the threshold value of each of the scan lines; and
providing an intensity difference analyzing step, wherein the intensity difference analyzing step is for analyzing intensity of the scan points of each of the scan lines to obtain a plurality of intensity difference values of any two adjacent ones of the scan points according to an edge detecting method and judging whether each of the scan points is a horizontal stripe edge point or a non-horizontal stripe edge point according to a comparison result of a predetermined difference value and the intensity difference values, and then determining a plurality of horizontal point cloud stripe points according to the horizontal stripe points and the horizontal stripe edge points of each of the scan lines; and
providing a vertical layer lane stripe judging step, comprising:
providing a continuity analyzing step, wherein the continuity analyzing step is for analyzing a slope of the horizontal point cloud stripe points of any two adjacent ones of the scan lines and judging whether each of the horizontal point cloud stripe points is a same lane stripe point or a different lane stripe point according to a comparison result of a predetermined threshold slope and the slope, and the same lane stripe point is corresponding to the lane stripe.

10. The lane stripe detecting method of claim 9, wherein,
in the point cloud intensity judging step, at least two of the threshold values of the scan lines are different from each other; and
in the intensity difference analyzing step, the edge detecting method is a first-order differential calculation.

11. The lane stripe detecting method of claim 9, wherein the data acquisition transforming step comprises:
providing a point cloud data acquisition step, wherein the point cloud data acquisition step is for driving the three-dimensional LIDAR sensor to emit a plurality of laser-emitting points to the road surface, and then the three-dimensional LIDAR sensor receives the laser-emitting points reflected from the road surface to generate a plurality of three-dimensional LIDAR sensor scan point coordinates and transmits the three-dimensional LIDAR sensor scan point coordinates to a point cloud processing unit; and
providing a data coordinate transforming step, wherein the data coordinate transforming step is for utilizing the point cloud processing unit to transform the three-dimensional LIDAR sensor scan point coordinates to the vehicle scan point coordinates according to the coordinate transformation equation.

12. The lane stripe detecting method of claim 9, wherein the coordinate transformation equation comprises a vertical viewing angle, a roll angle, a height of the three-dimensional LIDAR sensor above the road surface, the three-dimensional LIDAR sensor scan point coordinates and the vehicle scan point coordinates, the vertical viewing angle is represented as α, the roll angle is represented as β, the height of the three-dimensional LIDAR sensor above the road surface is represented as h, the three-dimensional LIDAR sensor scan point coordinates are represented as (x',y',z'), the vehicle scan point coordinates are represented as (x,y,z), and the coordinate transformation equation is described as follows:

$$\begin{bmatrix} x \\ y \\ z \end{bmatrix} = \begin{bmatrix} 0 \\ 0 \\ h \end{bmatrix} + \begin{bmatrix} \cos\beta & 0 & \sin\beta \\ 0 & 1 & 0 \\ -\sin\beta & 0 & \cos\beta \end{bmatrix} \times \begin{bmatrix} 1 & 0 & 0 \\ 0 & \cos\alpha & \sin\alpha \\ 0 & -\sin\alpha & \cos\alpha \end{bmatrix} \times \begin{bmatrix} x' \\ y' \\ z' \end{bmatrix}.$$

13. The lane stripe detecting method of claim 9, further comprising:
providing a point cloud height filtering step, wherein the point cloud height filtering step is for generating a filtering line according to a filtering line height value, the vehicle scan point coordinates comprises a plurality of vehicle coordinate height values, and then the point cloud height filtering step is for removing a part of the scan points if the vehicle coordinate height values of the part of the scan points are greater than the filtering line height value according to the filtering line.

14. The lane stripe detecting method of claim 9, wherein the horizontal layer lane stripe judging step further comprises:
providing a lane stripe width filtering step, wherein the lane stripe width filtering step is for analyzing the horizontal point cloud stripe points to obtain at least one lane stripe width and judging whether each of the horizontal point cloud stripe points is a lane stripe marker or a non-lane stripe marker according to a comparison result of a reasonable lane stripe width range and the at least one lane stripe width.

15. The lane stripe detecting method of claim 14, wherein,
in the lane stripe width filtering step, the reasonable lane stripe width range comprises a lane stripe maximum width value and a lane stripe minimum width value;
when the at least one lane stripe width is less than or equal to the lane stripe maximum width value and greater than or equal to the lane stripe minimum width value, each of the horizontal point cloud stripe points is regarded as a single lane stripe of the lane stripe marker;
when the at least one lane stripe width is greater than the lane stripe maximum width value or less than the lane stripe minimum width value, each of the horizontal point cloud stripe points is regarded as the non-lane stripe marker.

16. The lane stripe detecting method of claim 14, wherein,
in the lane stripe width filtering step, the horizontal point cloud stripe points are analyzed to obtain a first lane stripe width and a second lane stripe width, and the reasonable lane stripe width range comprises a lane stripe maximum width value, a lane stripe minimum width value and a predetermined gap width value;
when the first lane stripe width and the second lane stripe width are both less than or equal to the lane stripe maximum width value and greater than or equal to the lane stripe minimum width value, and a distance between a first part of the horizontal point cloud stripe points corresponding to the first lane stripe width and a second part of the horizontal point cloud stripe points corresponding to the second lane stripe width is less than or equal to the predetermined gap width value, each of the first part of the horizontal point cloud stripe points corresponding to the first lane stripe width and the second part of the horizontal point cloud stripe points corresponding to the second lane stripe width is regarded as a dual lane stripe of the lane stripe marker.

17. The lane stripe detecting method of claim 9, wherein the vertical layer lane stripe judging step further comprises:
providing a lane stripe fitting step, wherein the lane stripe fitting step is for fitting a plurality of coordinate values of the same lane stripe points of the horizontal point cloud stripe points to generate a predicted vertical layer lane stripe according to a lane stripe fitting equation, and the predicted vertical layer lane stripe is corresponding to the lane stripe.

18. A lane stripe detecting system based on a three-dimensional LIDAR, which is configured to detect a lane stripe of a road surface around a vehicle, the lane stripe detecting system comprising:
a three-dimensional LIDAR sensor disposed on the vehicle, wherein the three-dimensional LIDAR sensor is configured to obtain a plurality of three-dimensional LIDAR scan point coordinates of the road surface; and
a point cloud processing unit signally connected to the three-dimensional LIDAR sensor and comprising:
a data acquisition transforming module signally connected to the three-dimensional LIDAR sensor, wherein the data acquisition transforming module is configured to transform the three-dimensional LIDAR scan point coordinates into a plurality of vehicle scan point coordinates according to a coordinate transformation equation, the vehicle scan point coordinates are divided into a plurality of scan lines, and each of the scan lines has a plurality of scan points;

a horizontal layer lane stripe judging module signally connected to the data acquisition transforming module, wherein the horizontal layer lane stripe judging module is configured to calculate intensity of the scan points of each of the scan lines to obtain a threshold value according to a thresholding method and judge whether each of the scan points is a horizontal stripe point or a non-horizontal stripe point according to the threshold value of each of the scan lines, and at least two of the threshold values of the scan lines are different from each other; and a vertical layer lane stripe judging module signally connected to the horizontal layer lane stripe judging module, wherein the vertical layer lane stripe judging module is configured to analyze a slope of the horizontal stripe points of any two adjacent ones of the scan lines and judge whether each of the horizontal stripe points is a same lane stripe point or a different lane stripe point according to a comparison result of a predetermined threshold slope and the slope, and the same lane stripe point is corresponding to the lane stripe.

* * * * *